(12) United States Patent
Fukuyama et al.

(10) Patent No.: US 8,397,132 B2
(45) Date of Patent: Mar. 12, 2013

(54) MEMORY DEVICE

(75) Inventors: Hiroyuki Fukuyama, Yamanashi (JP); Satoshi Miyazaki, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 493 days.

(21) Appl. No.: 12/700,986

(22) Filed: Feb. 5, 2010

(65) Prior Publication Data
US 2010/0218072 A1 Aug. 26, 2010

(30) Foreign Application Priority Data
Feb. 23, 2009 (JP) .................................. 2009-039455

(51) Int. Cl.
*G11C 29/00* (2006.01)
(52) U.S. Cl. ........................ 714/763; 714/799
(58) Field of Classification Search .................. 714/763, 714/799
See application file for complete search history.

(56) References Cited

U.S. PATENT DOCUMENTS

| | | | | |
|---|---|---|---|---|
| 4,964,129 | A | * | 10/1990 | Bowden et al. ............... 714/764 |
| 5,226,043 | A | * | 7/1993 | Pughe et al. .................. 714/768 |
| 5,659,678 | A | * | 8/1997 | Aichelmann et al. .......... 714/25 |
| 6,185,134 | B1 | | 2/2001 | Tanaka |
| 6,219,807 | B1 | | 4/2001 | Ebihara et al. |
| 2001/0003510 | A1 | | 6/2001 | Kasai et al. |
| 2004/0153902 | A1 | * | 8/2004 | Machado et al. ............. 714/710 |
| 2009/0006899 | A1 | * | 1/2009 | Gara et al. ....................... 714/42 |

FOREIGN PATENT DOCUMENTS

| | | |
|---|---|---|
| JP | 62-146500 | 6/1987 |
| JP | 63-222398 | 9/1988 |
| JP | 11-143787 | 5/1999 |
| JP | 11-242899 | 9/1999 |
| JP | 2000-173289 | 6/2000 |
| JP | 2001-167596 | 6/2001 |
| JP | 2009-039455 | 2/2009 |

\* cited by examiner

*Primary Examiner* — Guy Lamarre
(74) *Attorney, Agent, or Firm* — Taft Stettinius & Hollister LLP

(57) ABSTRACT

An exemplary memory device has at least one memory chip that stores data and error correcting information. An error detecting circuit in the memory chip performs a calculation on the data and error correcting information to obtain error detection information indicating the locations of bit errors in the data. The uncorrected data and the error detection information are output from the memory chip. The uncorrected data and error detection information may also be output from the memory device, or the memory device may include a memory controller chip with an error correcting circuit that uses the error detection information to correct the bit errors and outputs corrected data from the memory device.

14 Claims, 12 Drawing Sheets

FIG.4

$$H = \begin{pmatrix} \alpha^{143} & \alpha^{142} & \alpha^{141} & \alpha^{140} & \alpha^{139} & \cdots & \alpha^4 & \alpha^3 & \alpha^2 & \alpha & 1 \\ \alpha^{179} & \alpha^{171} & \alpha^{168} & \alpha^{165} & \alpha^{162} & \cdots & \alpha^{12} & \alpha^9 & \alpha^6 & \alpha^3 & 1 \end{pmatrix}$$

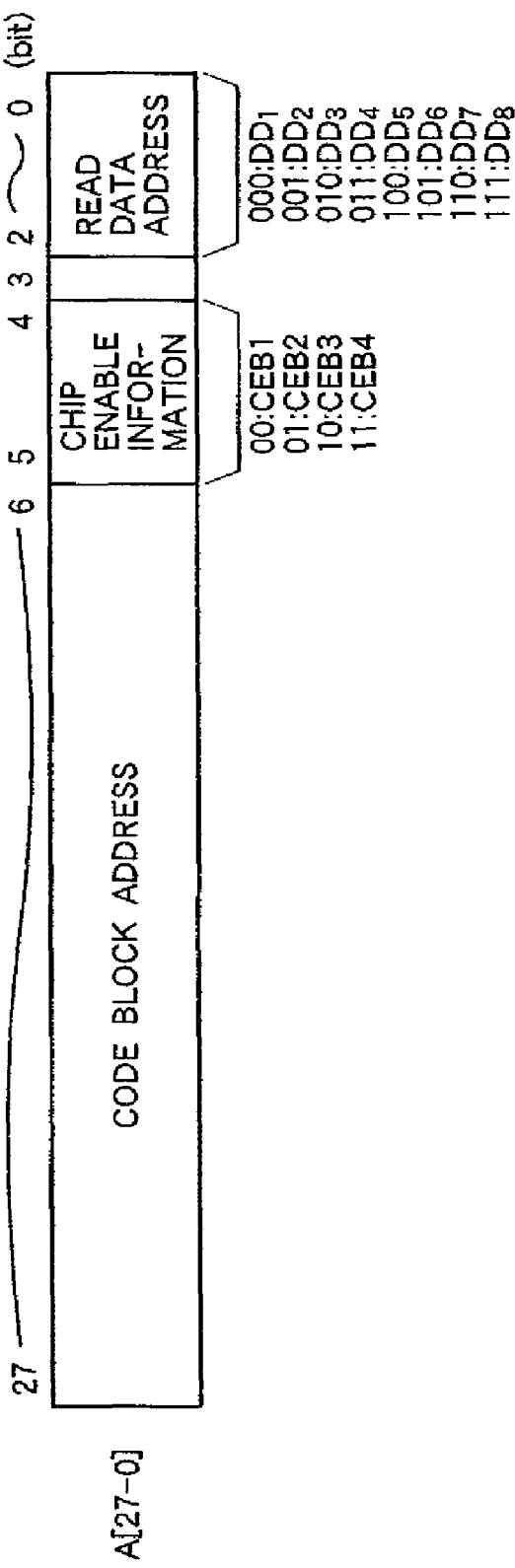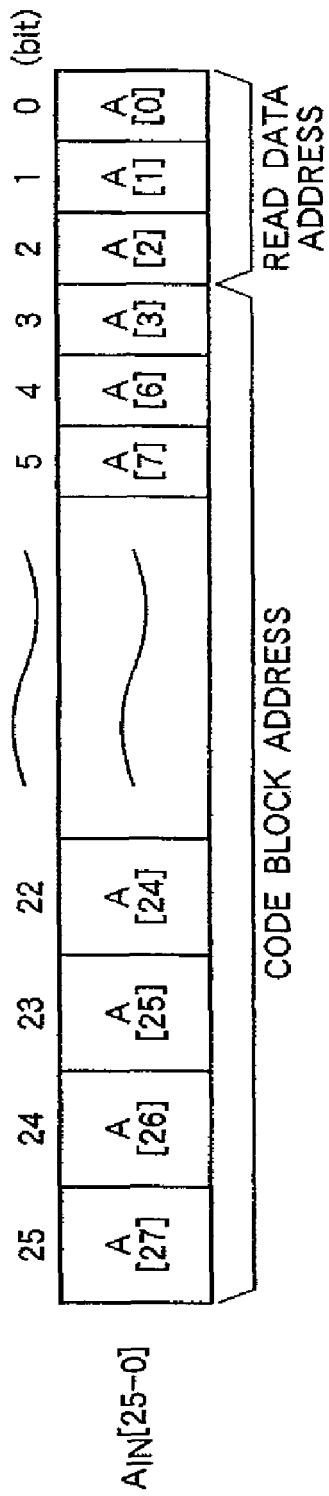

FIG.8

$$H = \begin{pmatrix} \alpha^{192} & \alpha^{186} & \alpha^{143} & \alpha^{142} & \alpha^{140} & \alpha^{139} & \alpha^{138} & \alpha^{136} & \alpha^{135} & \cdots & \alpha^4 & \alpha^3 & \alpha^2 & \alpha & 1 \\ \alpha^{66} & \alpha^{48} & \alpha^{174} & \alpha^{171} & \alpha^{165} & \alpha^{162} & \alpha^{159} & \alpha^{153} & \alpha^{150} & \cdots & \alpha^{12} & \alpha^9 & \alpha^6 & \alpha^3 & 1 \end{pmatrix}$$

MEMORY DEVICE

CROSS-REFERENCE TO RELATED APPLICATIONS

This application is based on and claims priority under 35 U.S.C. §119 from Japanese Patent Application No. 2009-039455, filed Feb. 23, 2009, the disclosure of which is incorporated by reference herein.

RELATED ART

1. Field of the Invention

The present disclosure relates to a semiconductor memory device, more particularly to a semiconductor memory device capable of detecting and correcting data errors.

2. Brief Discussion of Related Art

In the years since memory devices including one or more semiconductor integrated circuit (IC) memory chips and a controller IC chip to control the reading and writing of data in the memory chips were first proposed, such devices have come into widespread use as file systems for personal computers and other electronic devices. To assure the integrity of the data stored in the memory chips, memory chips with encoding and decoding circuits that detect and correct data errors are often used, as described in Japanese Patent Application Publication No. 11-143787. The controller IC chip has similar encoding and decoding circuits that assure integrity of data communication with external devices.

A problem with this configuration is that the encoding and decoding circuits in the memory chips occupy space. In a device with many memory chips, much space is used up by these circuits, increasing the size and cost of the device.

INTRODUCTION TO THE INVENTION

An exemplary objective of the disclosure is to decrease the size and cost of a memory device including one or more memory chips and having facilities for detecting data errors.

A further exemplary objective of the disclosure is to decrease the size and cost of a memory device including one or more memory chips and a memory controller chip and having facilities for detecting and correcting data errors.

The disclosure accordingly provides a novel memory device including at least one memory chip having a memory array for storing data and error correcting information. The memory chip also includes an error detecting circuit for performing a calculation, such as a syndrome calculation, on the data and error correcting information to obtain error detection information indicating the locations of bit errors in the data. A first output circuit outputs uncorrected data and corresponding error detection information from the memory chip.

The uncorrected data and error detection information may also be output from the memory device itself.

Alternatively, the memory device may include a memory controller chip that receives the uncorrected data and error detection information from the memory chip(s). The memory controller chip has an error correcting circuit that uses the error detection information to correct the errors in the uncorrected data and a second output circuit that outputs the corrected data from the memory device.

Placing only the error detecting circuit, instead of both the error detecting circuit and the error correcting circuit, in each memory chip reduces the memory chip size and cost.

When the memory device includes a memory controller chip, placing only the error correcting circuit, instead of both the error detecting circuit and the error correcting circuit, in the memory controller chip reduces the size and cost of the memory controller chip.

The data and error correcting information stored in the memory array in each memory chip may be organized into code blocks with a specified read latency time per code block. The first output circuit then outputs both the uncorrected data and the error detection information within the specified read latency time. Performing the error detection calculation in the memory chip(s) within the read latency time enables corrected data to be obtained quickly.

The error correcting information may be structured so that when all '1' bits of data are stored in the memory array, the error correcting bits are also all '1'. This simplifies testing of the memory device.

BRIEF DESCRIPTION OF THE DRAWINGS

Exemplary embodiments of the present disclosure will be described in detail based on the following figures, wherein:

FIG. 4 illustrates an exemplary parity checking matrix;

FIG. 5A illustrates the external address signal structure in the exemplary novel memory device;

FIG. 5B illustrates the internal address signal structure in the exemplary novel memory device;

FIG. 8 illustrates another exemplary parity checking matrix;

DETAILED DESCRIPTION

The exemplary embodiments of the present disclosure are described and illustrated below to encompass a semiconductor device and, specifically, a semiconductor memory device capable of detecting and correcting data errors. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
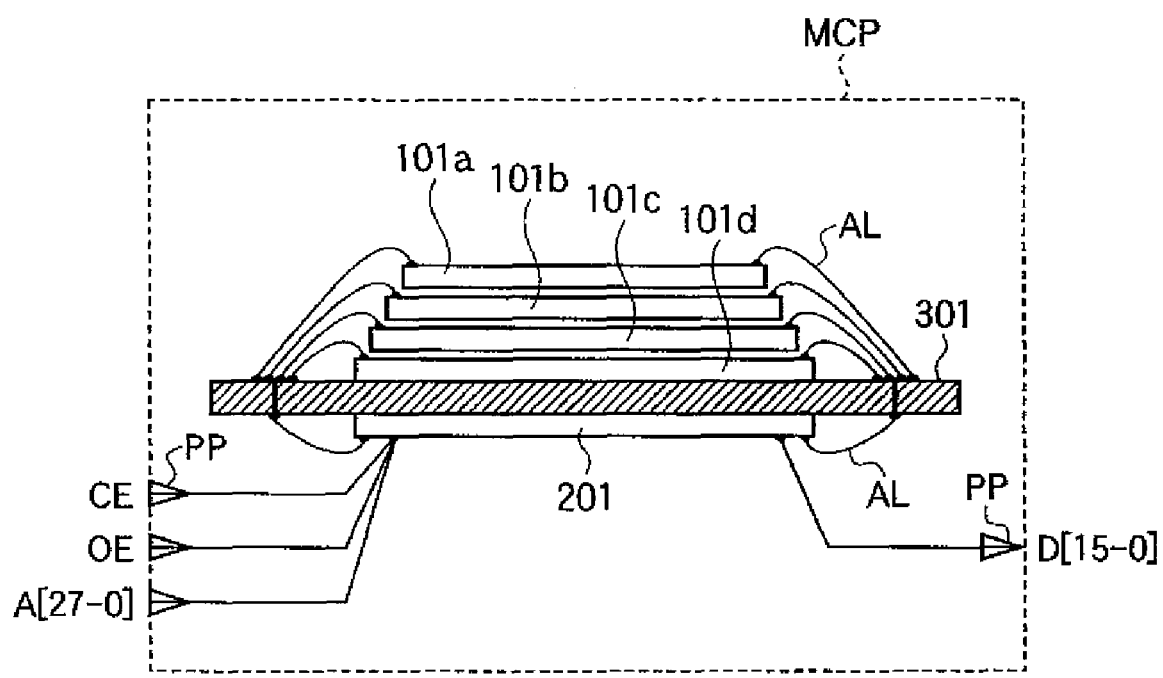
FIG. 1 is a side view of a multiple chip package incorporating an exemplary novel memory device.

Referring to the side view in FIG. 1, one embodiment is a novel memory device housed in a multiple chip package (MCP) indicated schematically by a dotted line. The memory device includes four memory chips 101*a*, 101*b*, 101*c*, 101*d* mounted one atop another on a substrate 301, and a single memory controller chip 201 mounted below the substrate 301. The memory chips 101*a*, 101*b*, 101*c*, 101*d* and the memory controller chip 201 are electrically connected by metal wires AL to wiring traces (not shown) on the two major surfaces of the substrate 301. The memory controller chip 201 is electrically connected to the memory chips 101a, 101b, 101c, 101d by these wiring traces and by metal vias that pass through the substrate 301. The memory controller chip 201 is also connected to the external package pins PP of the multiple chip package for input of external address signals A[27-0], an external chip enable signal CE, and an external output enable signal OE, and input and output of data signals D[15-0].

Figure 2:
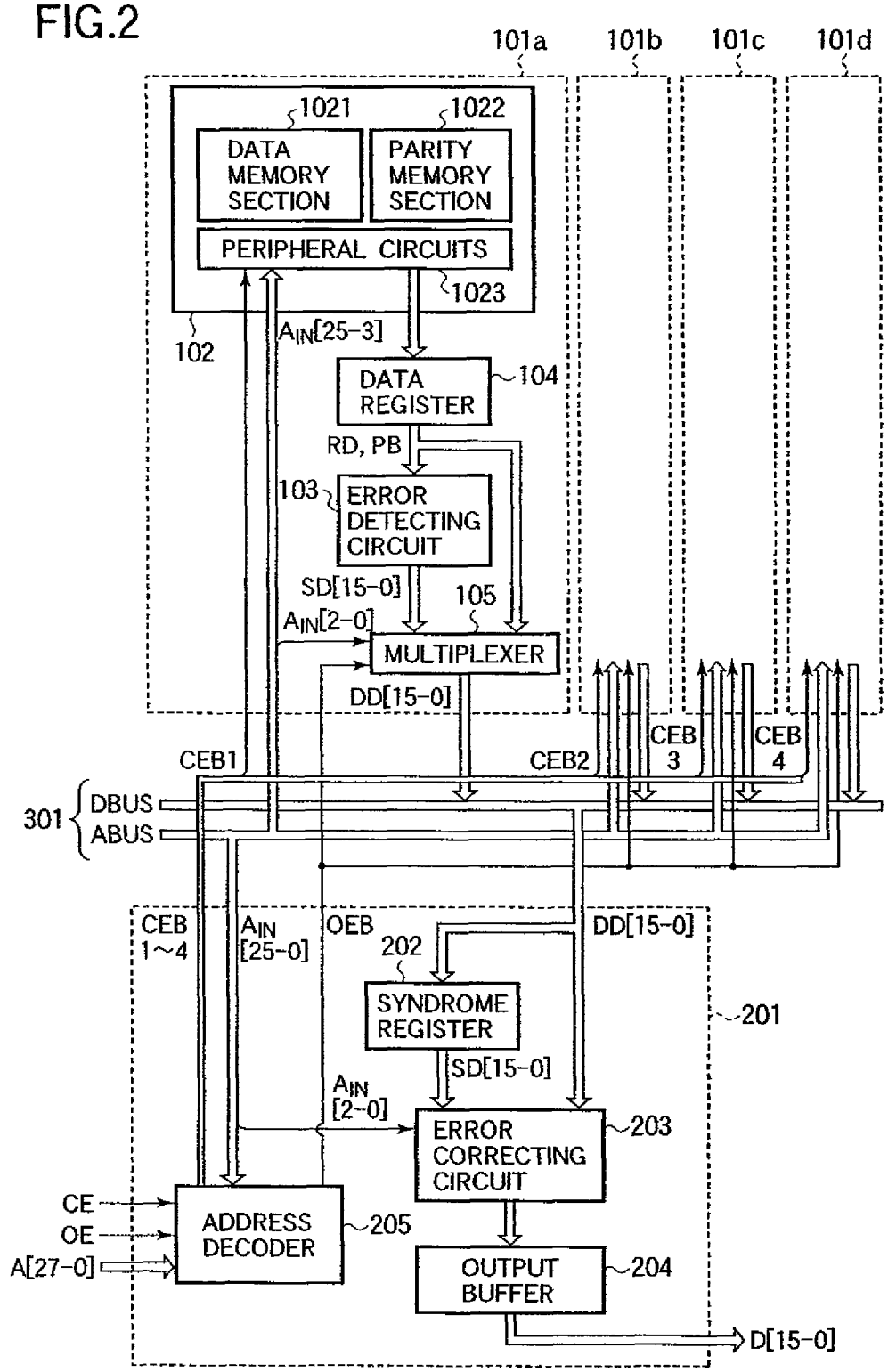
FIG. 2 is a functional block diagram of the novel memory device in FIG. 1.

Referring to the block diagram in FIG. 2, each of the memory chips 101a, 101b, 101c, 101d includes a memory array 102, an error detecting circuit 103, a data register 104, and a multiplexer 105 (the first output circuit), as shown for memory chip 101a. The memory chips 101a, 101b, 101c, 101d are connected to an address bus ABUS, a data bus DBUS, and a control bus on the substrate 301. The control bus includes signal lines for four internal chip enable signals CEB1, CEB2, CEB3, CEB4, which are supplied to memory chips 101a, 101b, 101c, 101d, respectively.

The memory array 102 includes a data memory section 1021 that stores, for example, two gigabits of data, a parity memory section 1022 that stores, for example, 256 megabits of error correcting information referred to as parity bits, and peripheral circuits 1023 that perform read and write access by reading data from and writing data to the data memory section 1021 and parity memory section 1022 at an address indicated by address bits $A_{IN}[25-3]$. The internal chip enable signals are active at the '0' logic level. Data in the memory array 102 in memory chip 101a are accessed when CEB1 is active, data in the memory array 102 in memory chip 101b are accessed when CEB2 is active, data in the memory array 102 in memory chip 101c are accessed when CEB3 is active, and data in the memory array 102 in memory chip 101d are accessed when CEB4 is active. In read access, 128 data bits RD and 16 corresponding parity bits PB are read simultaneously from the data memory section 1021 and parity memory section 1022 and stored in the data register 104.

Figure 3:
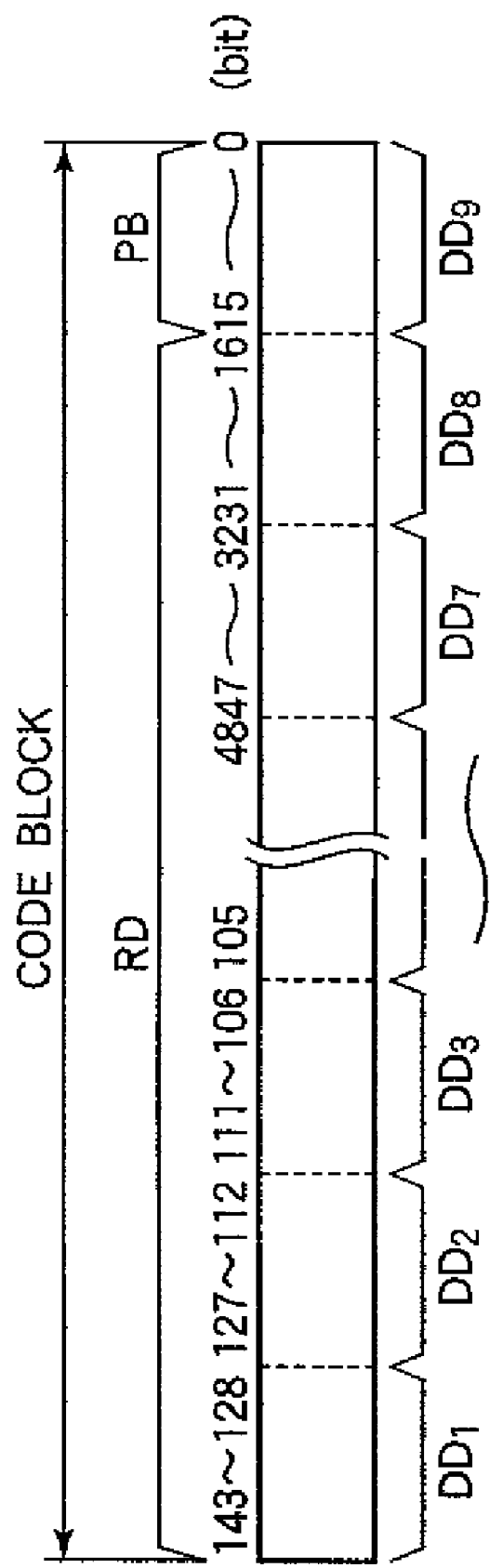
FIG. 3 illustrates the bit and word structure of a code block in the exemplary novel memory device.

The data register 104 concatenates the 16 parity bits PB with the 128 read data bits RD and supplies the resulting block of 144 bits (RD+PB) to the error detecting circuit 103 as a code block. The code block consists of nine 16-bit data words $DD_1$ to DD9 as shown in FIG. 3. The parity bits are located in the last data word DD9. The 128 read data bits RD in data words $DD_1$ to $DD_8$ are also supplied to the multiplexer 105.

The error detecting circuit 103 executes a syndrome calculation on the received code block to generate syndrome data SD[15-0] indicating the locations of erroneous bits. If, for example, a Bose-Chaudhuri-Hocquenghem (BCH) code with the generator polynomial $P(x)=x^8+x^4+x^3+x^2+x^1$ is used and the parity bits are generated using the parity checking matrix H shown in FIG. 4, in which α is a primitive root of unity in a Galois field, the error detecting circuit 103 executes a well known calculation based on the polynomial P(x) and the matrix H. The resulting syndrome data can pinpoint the position of up to two bit errors in the code block. The syndrome data SD[15-0] are supplied to the multiplexer 105 as indicated in FIG. 2.

The multiplexer 105 receives an internal output enable signal OEB from the memory controller chip 201. The internal output enable signal OEB is also active at the '0' logic level. When the internal output enable signal OEB and the corresponding internal chip enable signal CEB1, CEB2, CEB3, or CEB4 are both active, the multiplexer 105 outputs nine data words, one at a time, on the data bus DBUS. The first data word $DD_0$ includes the syndrome data SD[15-0]. The next eight data words $DD_1$ to $DD_8$ include the read data RD in the order indicated in FIG. 3, as listed in Table 1.

TABLE 1

| Read data words | |
| --- | --- |
| $DD_1$ | code block bits 143-128 |
| $DD_2$ | code block bits 127-112 |
| $DD_3$ | code block bits 111-96 |
| $DD_4$ | code block bits 95-80 |
| $DD_5$ | code block bits 79-64 |
| $DD_6$ | code block bits 63-48 |
| $DD_7$ | code block bits 47-32 |
| $DD_8$ | code block bits 31-16 |

These eight data words are selected by internal read data address signals $A_{IN}[2-0]$, which the multiplexer 105 receives from the address bus ABUS.

As shown in FIG. 2, the memory controller chip 201 includes a syndrome register 202, an error correcting circuit 203, an output buffer 204 (the second output circuit), and an address decoder 205. The memory controller chip 201 has output pads for output of the four internal chip enable signals CEB1-CEB4, the internal output enable signal OEB, twenty-six internal address signals $A_{IN}[25-0]$, and sixteen read data signals D[15-0], and for input of the external chip enable signal CE, the external output enable signal OE, the twenty-eight external address signals A[27-0], and sixteen internal read data signals DD[15-0].

The syndrome register 202 stores the first word $DD_0$ of data output on the data bus DBUS on the substrate 301 during read access, containing the syndrome data SD[15-0], and supplies the syndrome data SD[15-0] to the error correcting circuit 203.

The address decoder 205 generates the internal output enable signal OEB from the external chip enable signal CE and external output enable signal OE received at the MCP package pins PP. The internal output enable signal OEB is active ('0') when CE and OE are both active, and is inactive ('1') at other times. The internal output enable signal OEB is supplied to all four memory chips 101a, 101b, 101c, 101d.

While the external output enable signal OE is active, the address decoder 205 also generates the internal chip enable signals CEB1-CEB4 and the internal address signals $A_{IN}[25-0]$ from the external address signals A[27-0], and supplies these signals to the memory chips 101a, 101b, 101c, 101d.

More specifically, as indicated in FIG. 5A, the address decoder 205 generates the internal chip enable signals CEB1-CEB4 from the fourth and fifth external address signals A[4] and A[5], more compactly denoted A[5, 4]. When, for example, A[5, 4] is '00' (meaning that A[5] is '0' and A[4] is '0'), internal chip enable signal CEB1 activated (driven to the '0' logic level) and supplied through the substrate 301 to enable memory chip 101a. Similarly when A[5, 4] is '01', internal chip enable signal CEB2 is activated and supplied through the substrate 301 to enable memory chip 101b; when A[5, 4] is '10', internal chip enable signal CEB3 is activated and supplied through the substrate 301 to enable memory chip 101c; and when A[5, 4] is '11', internal chip enable signal CEB3 is activated and supplied through the substrate 301 to enable memory chip 101d.

The address decoder 205 uses the other external address signals A[27-6] and A[3-0] to generate the internal address signals $A_{IN}[25-0]$. The twenty-two most significant external address bits A[27-6] become the twenty-two most significant internal address signals $A_{IN}$[25-4] and the four least significant external address bits A[3-0] become the four least significant internal address bits $A_{IN}$[3-0]. The three least significant internal and external address bits $A_{IN}$[2-0] and A[2-0] form a read data address that selects one of the eight data words $DD_1$-$DD_8$ in Table 1, as indicated in FIGS. 5A and 5B. The other address signals $A_{IN}$[25-3], or A[27-6] and A[3], faun a code block address. The internal address signals $A_{IN}$[25-0] are supplied to the memory chips 101a to 101d via the address bus ABUS on the substrate 301.

The address decoder 205 supplies the internal read data address signals $A_{IN}$[2-0] to the error correcting circuit 203.

Figure 6:
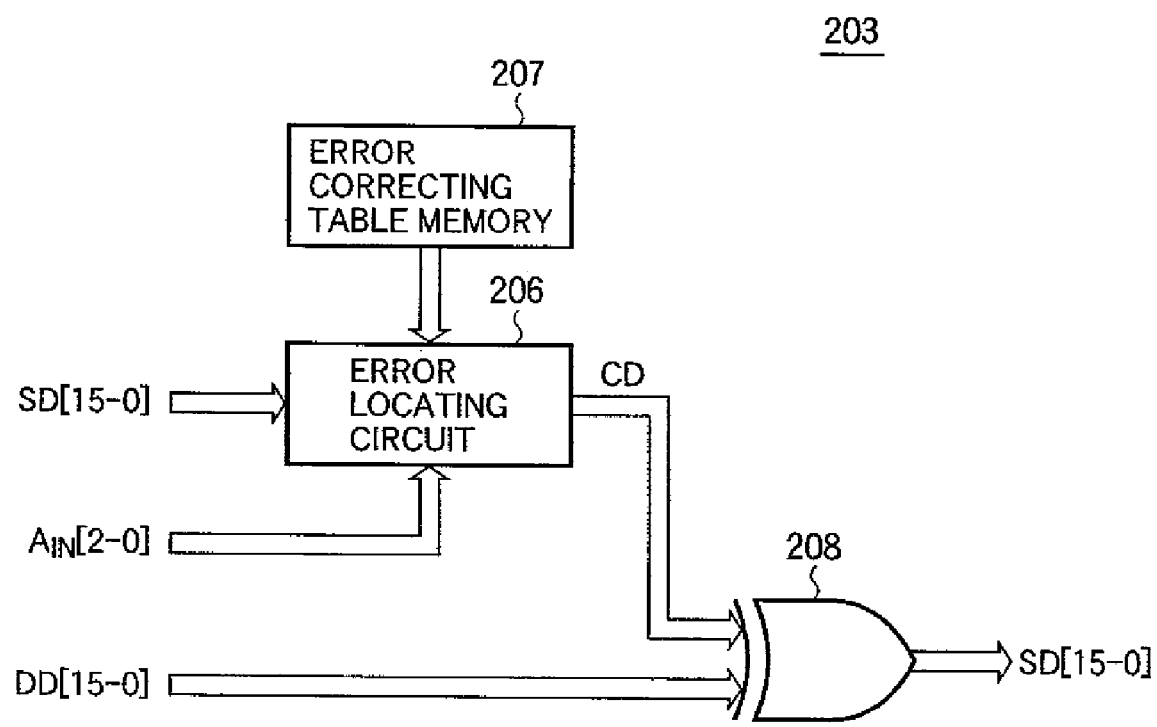
FIG. 6 is a schematic block diagram illustrating the internal structure of the error correcting circuit in FIG. 2.

Referring to the schematic block diagram in FIG. 6, the error correcting circuit 203 includes an error locating circuit 206, an error correcting table memory 207, and an exclusive logical OR circuit 208. The exclusive logical OR circuit 208 includes sixteen parallel one-bit exclusive logical OR gates (EX-OR gates).

The error correcting table memory 207 stores error position information indicating, for each possible bit pattern of the sixteen syndrome data bits SD[15-0], the corresponding positions of errors in the 144-bit code block (RD+PB).

The error locating circuit 206 receives the syndrome data SD[15-0], reads the corresponding error position information from the error correcting table memory 207, and generates 144 bits of corrective data QD in which a '1' bit indicates the position of an error and a '0' bit indicates a position that is error-free. The error locating circuit 206 then uses the internal read data address signals $A_{IN}$[2-0] to select the sixteen QD bits corresponding to the sixteen bits of read data DD[15-0] in one of data words $DD_1$ to $DD_8$. For example, if internal address signals $A_{IN}$[2-0] indicate data word $DD_2$, consisting of bits 127-112 in the 144-bit code block (RD+PB), the error locating circuit 206 selects bits 127-112 of the corrective data QD. The sixteen selected bits of corrective data are output to the exclusive logical OR circuit 208 as a corrective data word CD.

The exclusive logical OR circuit 208 also receives the sixteen-bit word of read data DD[15-0] currently output on the data bus DBUS, performs a bit-wise exclusive OR operation on the read data word DD[15-0] and the corrective data word CD, and outputs the resulting word of corrected data D[15-0] to the output buffer 204. If the read data word DD[15-0] is error-free, then all bits of the corrective word CD are '0' and the corrected data word D[15-0] is identical to the read data word DD[15-0]. If there is an error in the read data word DD[15-0], the corresponding bit in the corrective data word CD is set to '1', so the exclusive OR operation inverts the erroneous data bit, thereby correcting the error.

Figure 7:
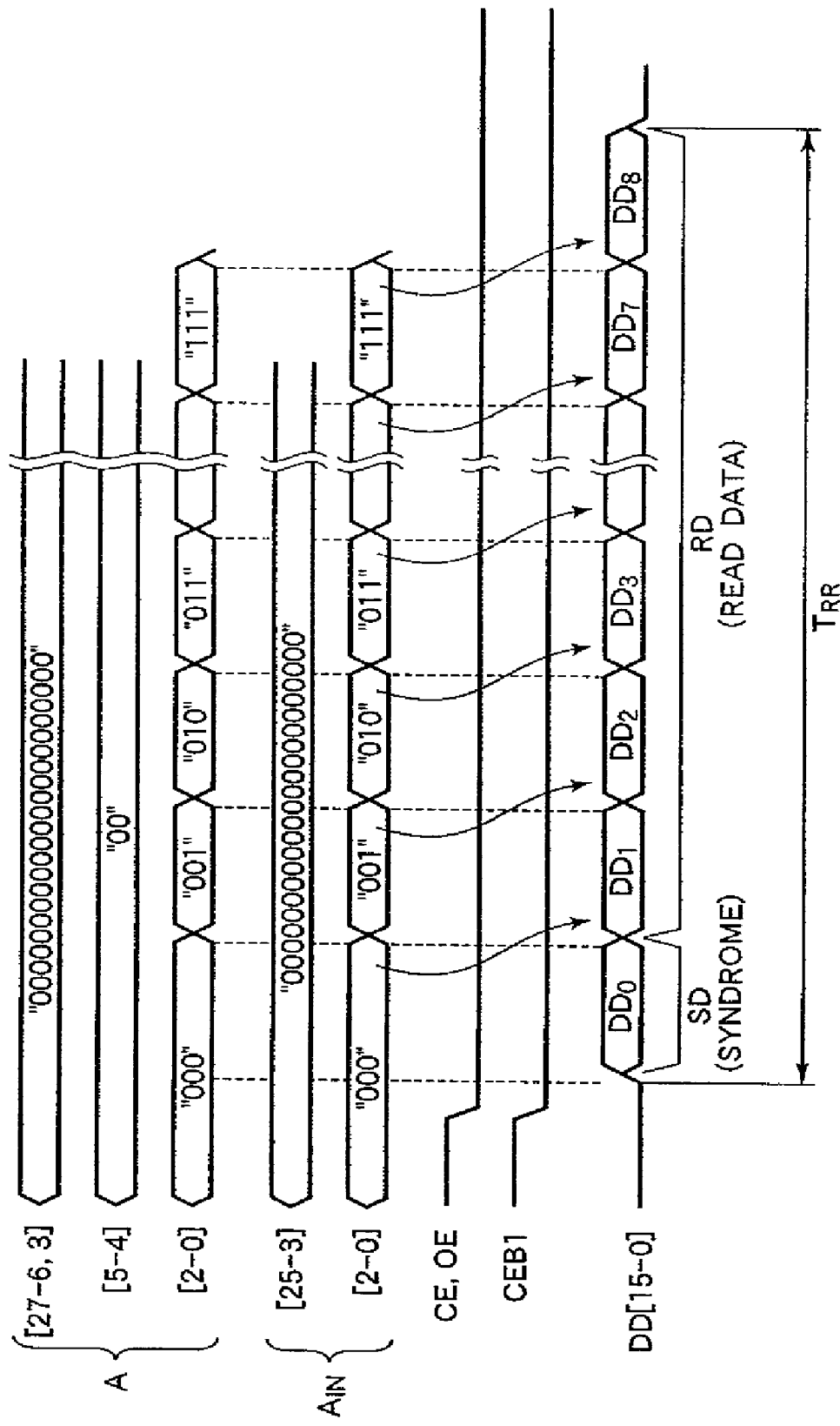
FIG. 7 is a timing diagram illustrating read access to one code block of data.

Read access to the 128 bits of read data RD stored at addresses '0000000' to '0000008' (in hexadecimal address notation) is illustrated in FIG. 7. The external address signals A[27-0] are originally all zero (hexadecimal '0000000'). In binary notation, the code block address A[27-6, 3] consisting of address signals A[27-6] and A[3] is '000000000000000000000000', the memory chip address A[5, 4] is '00', indicating memory chip 101a, and the read data address A[2-0] is '000', selecting read data word $DD_1$, as indicated at the top of FIG. 7. From A[27-6,3] and A[2-0], the address decoder 205 generates a corresponding internal code block address $A_{IN}$[25-3] and read data address $A_{IN}$[2-0], all bits of which are likewise '0'. Since the memory chip address signals A[5, 4] are '00', when the external chip enable signal CE and output enable signal OE are activated by being driven to the low ('1') logic level, the address decoder 205 activates internal chip enable signal CEB1 by driving it also to the low ('0') logic level.

In memory chip 101a, the 144-bit code block stored at the address '00000000000000000000000' given by internal address signals $A_{IN}$[25-3], including 128 data bits (RD) and 16 parity bits (PB), is read from the memory array 102 into the data register 104. The error detecting circuit 103 performs a syndrome calculation on the 144 bits in the data register 104 and sends the resulting word of syndrome data SD[15-0] to the multiplexer 105. The multiplexer 105 outputs the syndrome data SD[15-0] on the data bus DBUS as read data DD[15-0], more specifically as data word $DD_0$, as shown at the bottom of FIG. 7. This data word $DD_0$ is received by the memory controller chip 201 and stored in the syndrome register 202. The error correcting circuit 203 generates corrective data QD from the syndrome data SD[15-0] in word $DD_0$.

Next, while the external and internal read data address signals A[2-0] and $A_{IN}$[2-0] are still '000', the multiplexer 105 takes the first read data word $DD_1$, consisting of read data bits 143-128 as shown in FIG. 3, from the data register 104 and places it on the data bus DBUS as read data DD[15-0]. In the memory controller chip 201, the error correcting circuit 203 receives this word $DD_1$ from the data bus DBUS, corrects it as described above, and outputs the corrected data D[15-0] to the output buffer 204. The output buffer 204 outputs the corrected data D[15-0] to the package pins of the multiple chip package.

When the multiplexer 105 in memory chip 101 a places the first read data word $DD_1$ on the data bus DBUS, data address signals A[2-0] and $A_{IN}$[2-0] change from '000' to '001', causing the multiplexer 105 to take the second read data word $DD_2$ (bits 127-112) from the data register 104. After the first data word $DD_1$ has been corrected by the error correcting circuit 203 and sent to the output buffer 204, the multiplexer 105 places the second data word $DD_2$ on the data bus DBUS. The error correcting circuit 203 in the memory controller chip 201 receives this word $DD_2$, corrects it as described above, and outputs the corrected data D[15-0] to the output buffer 204, replacing the corrected data of the first read data word $DD_1$. The output buffer 204 outputs the corrected data to the package pins.

While the data in the second read data word $DD_2$ are being corrected and output, data address signals A[2-0] and $A_{IN}$[2-0] change to '010', and the third read data word $DD_3$ (bits 111-96) is accessed in the same way, being taken from the data register 104 by the multiplexer 105 in memory chip 101a, then output on the data bus DBUS, received by the error correcting circuit 203 in the memory controller chip 201, corrected, sent to the output buffer 204, and output from the memory device.

Access continues in this way as the read data address signals A[2-0] change successively from '011' to '111', causing successive output of the corrected data D[15-0] for data words $DD_4$ to $DD_8$ (bits 95-16 of the read data RD). At the conclusion of this operation, 128 bits of corrected data have been output from the 144-bit code block stored at hexadecimal address '0000000' in memory chip 101a. The total time during which the syndrome data and read data are being transferred from the memory chip to the memory controller chip 201 is within the read latency time $T_{RR}$ specified for the memory chips.

The data stored in other code blocks in memory chip 101a and the data stored in the other memory chips 101b, 101c, 101d are accessed similarly.

An advantage of this novel memory device is that while each memory chip 101a, 101b, 101c, 101d has an error detecting circuit 103, only the memory controller chip 201 has an error correcting circuit 203. Compared with conventional memory devices in which each memory chip has both an error detecting circuit and an error correcting circuit, a significant amount of space is saved by placing an error correcting circuit 203 only in the memory controller chip 201. The amount of space saved increases as the number of memory chips in the memory device increases. This saving in space is achieved without any loss of performance because the syndrome calculation, which requires access to all 144 bits of data in a code block, is carried out in the memory chips, where all 144 bits are available at once in the data register 104.

Another advantage of the novel memory device is that since the error detecting circuits 103 and the error correcting circuit 203 are in separate chips, each of these chips can be smaller than would be possible if both the error detecting circuit and error correcting circuit were placed in the same chip.

In a variation of the embodiment described above, the parity checking matrix H in FIG. 4 is replaced by the parity checking matrix H shown in FIG. 8. The code blocks are generated by using this checking matrix H and the generator polynomial P(x) given above:

$$P(x)=x^8+x^4-x^3+x^2+x^1$$

An advantage of the parity checking matrix H in FIG. 8 is that if all 128 bits of read data RD in a code block have the '1' logic level, then all 16 bits of parity data PB in the same code block also have the '1' logic level. Conversely, if all 128 bits of read data RD in a code block have the '0' logic level, then all 16 bits of parity data PB in the same code block also have the '0' logic level. This greatly simplifies the pre-shipment inspection of the memory device. A pre-shipment inspection is carried out by writing a test pattern, such as a pattern in which all bits in both the data memory section 1021 and the parity memory section 1022 are '1' (or all bits are '0'), or a checkerboard pattern of '1' and '0' bits, into the memory device, and then reading the written data. With the parity checking matrix in FIG. 8, in the initial or erased state, for example, in which all bits are '1', the device can be tested simply by reading all of its data; it is not necessary to derive the parity bit values for 128 bits of all '1' data and then write these parity bit values separately into the parity memory section 1022 in advance.

Figure 9:
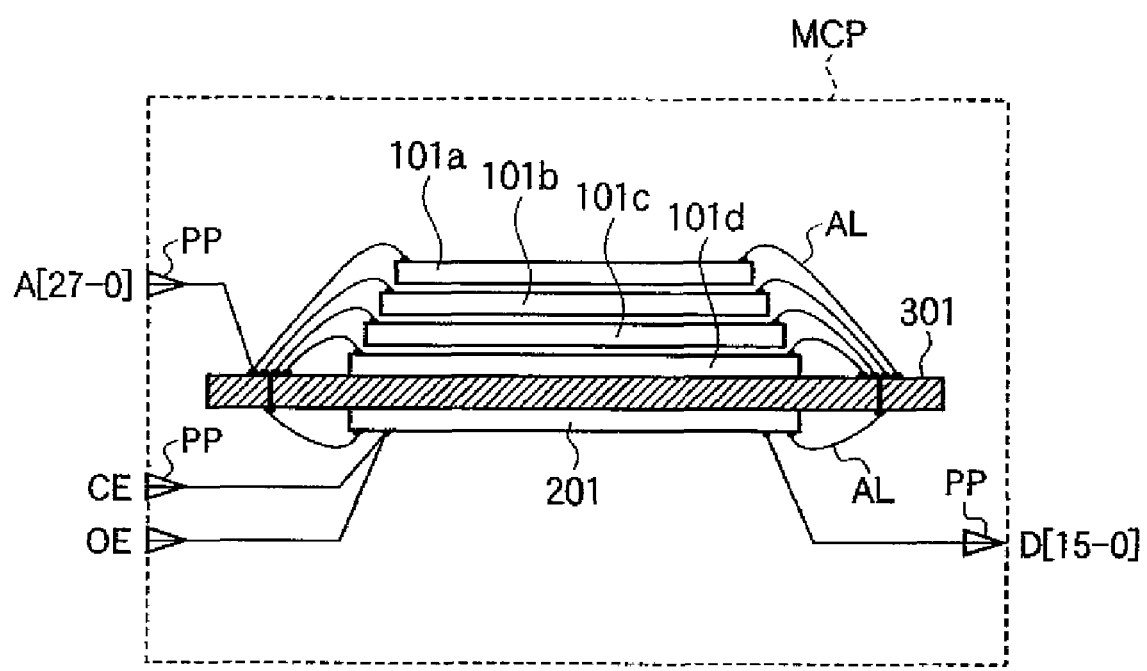
FIG. 9 is a side view of a multiple chip package incorporating another novel memory device.
Figure 10:
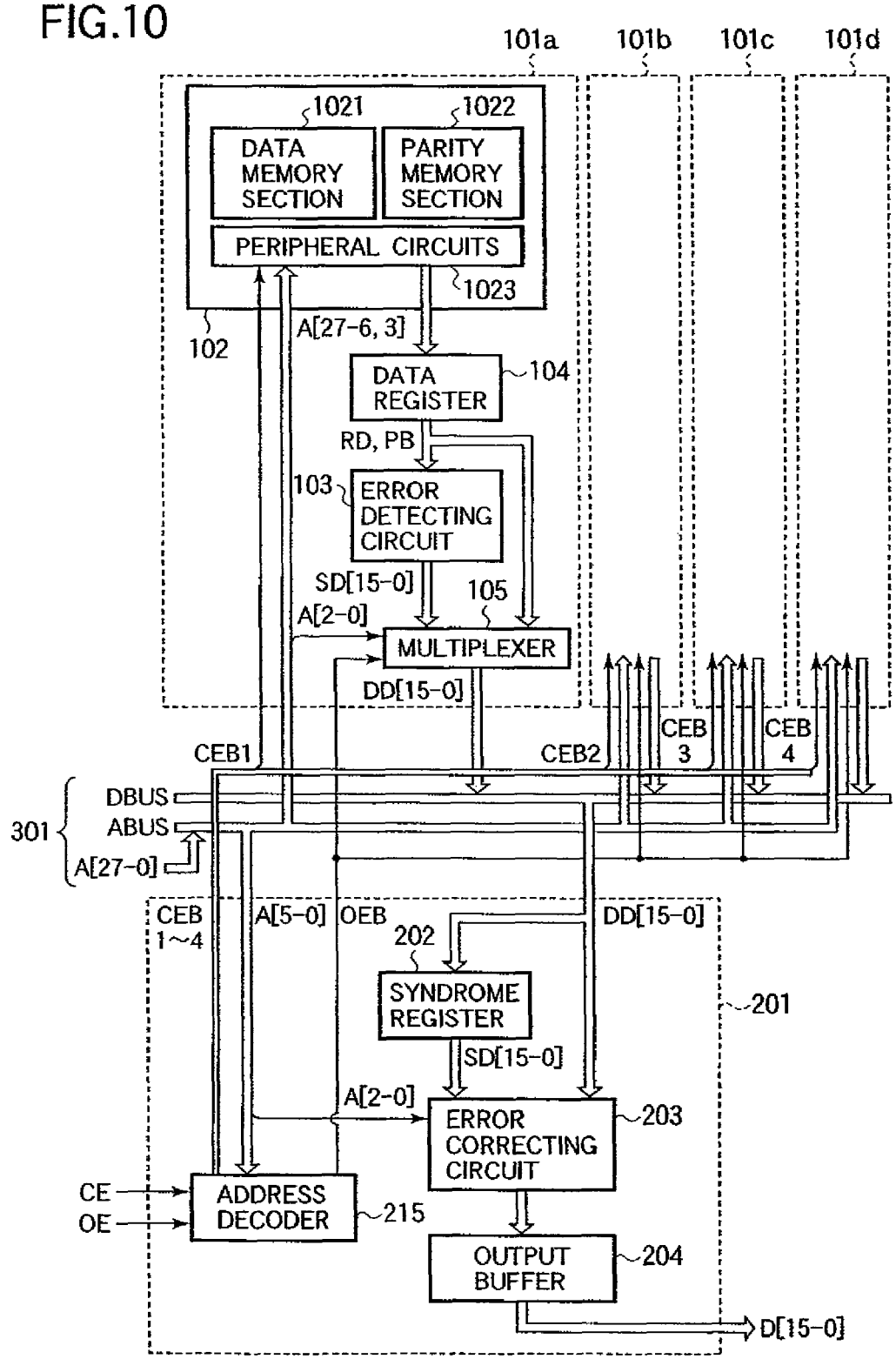
FIG. 10 is a functional block diagram of the novel memory device in FIG. 9.

Referring to FIGS. 9 and 10, in another variation of the embodiment described above, the external address signals A[27-0] are supplied directly from the package pins PP of the multiple chip package MCP to the address bus ABUS on the substrate 301, instead of being supplied to the address bus through the address decoder in the memory controller chip 201. The peripheral circuits 1023 in the memory chips 101 a to 101d take twenty-six address signals A[27-6, 3] from the address bus ABUS. The multiplexer 105 in the memory chips 101a to 101d and the error correcting circuit 203 in the memory controller chip 201 take three address signals A[2-0] from the address bus ABUS. These circuits operate as described above. The address decoder 215 in the memory controller chip 201 receives the external chip enable signal CE and external output enable signal OE, takes address signals A[5-0] from the address bus, and generates the internal chip enable signals CEB1-CEB4 and the internal output enable signal OEB as described above.

Compared with the memory device shown in FIGS. 1 and 2, the memory device in FIGS. 9 and 10 permits higher speed read access because address signals A[27-6, 3] reach the memory arrays 102 directly from the package pins PP, without undergoing a propagation delay in the address decoder. In FIG. 7, the read cycle and accordingly the read latency time $T_{RR}$ can be shortened.

In another variation of the embodiment described above, the number of memory chips is altered from four to some other number. The embodiment(s) can be practiced in any memory device having one memory controller chip and at least one memory chip mounted on the same substrate.

The memory controller chip and the memory chip(s) do not have to be mounted on opposite sides or the substrate. Memory chips may be distributed on both sides of the substrate. Alternatively, the memory controller chip and all the memory chips may be mounted on the same side of the substrate.

The disclosure is not limited to the use of a BCH error correcting code. For example, a Hamming code may be used instead.

The disclosure is not limited to 144-bit code blocks with 128 data bits and 16 parity bits. The code blocks may have other numbers of data bits and parity bits.

The error correcting circuit 203 and the other parts of the memory controller chip 201 do not have to be located on the same chip. The error correcting circuit 203 may be located on a separate chip, or in a separate package.

Figure 11:
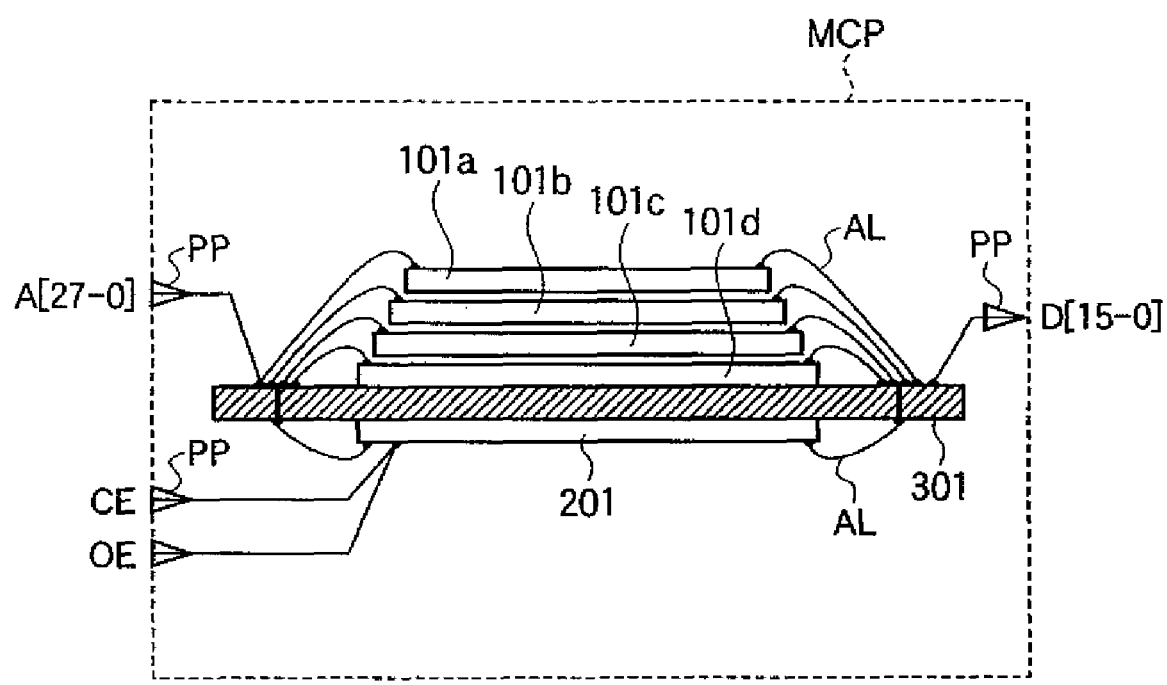
FIG. 11 is a side view of a multiple chip package incorporating yet another novel memory device.
Figure 12:
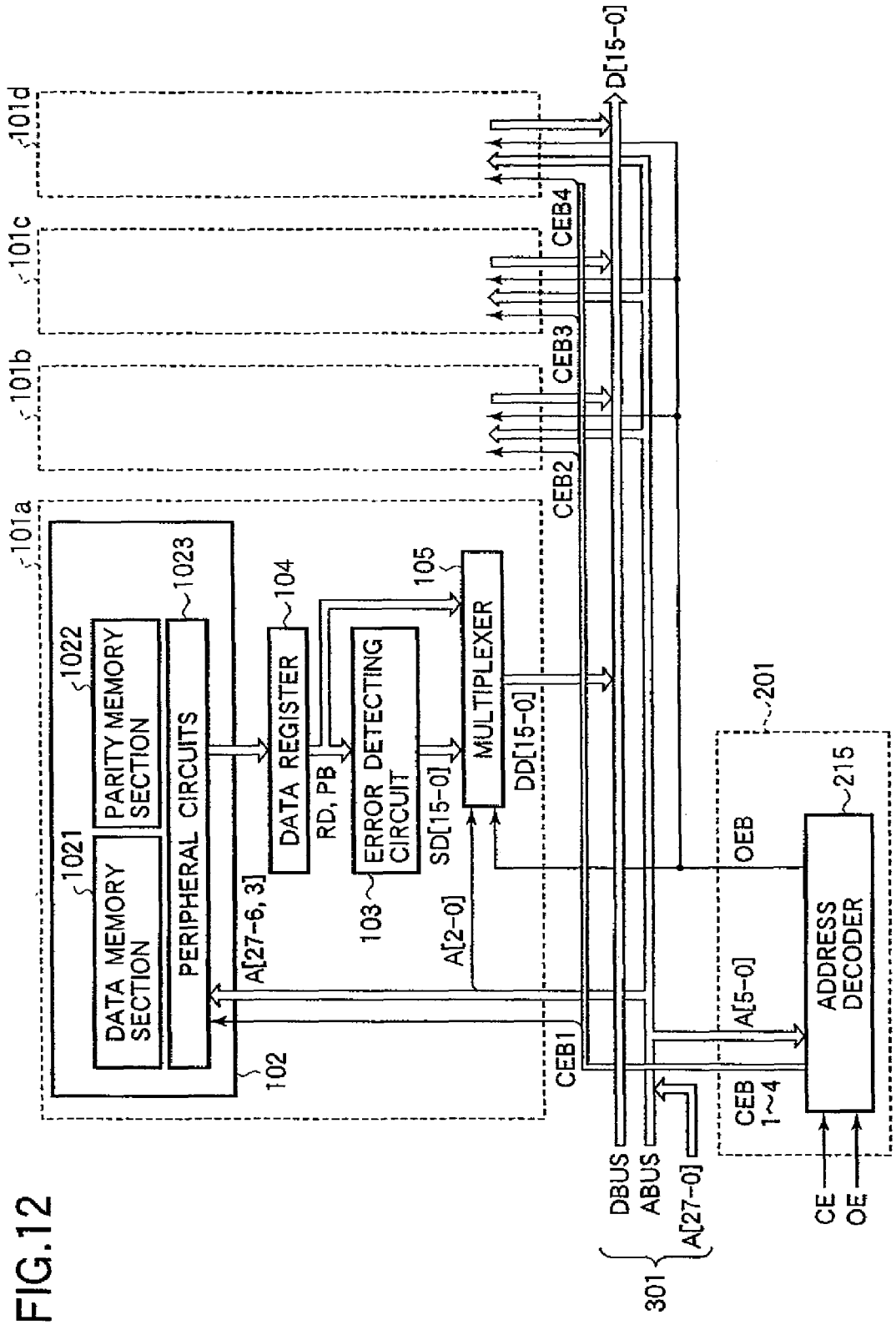
FIG. 12 is a functional block diagram of the novel memory device in FIG. 11.

This last variation is illustrated in FIGS. 11 and 12. As in FIGS. 9 and 10, the external address signals A[27-0] are supplied from the package pins PP directly to the address bus ABUS on the substrate 301. The four memory chips 101a to 101d have the same configuration as in FIG. 10. The memory controller chip 201 consists only of an address decoder 215 similar to the address decoder 215 in FIG. 10, which generates the internal chip enable signals CEB1-CEB4 and the internal output enable signal OEB. The data bus DBUS is connected directly to the package pins PP. The data D[15-0] output from the memory device are accordingly the uncorrected read data and the syndrome data placed on the data bus DBUS by the multiplexer 105 in each memory chip. An external device (not shown) receives both the syndrome data and the uncorrected read data from the package pins, and uses the syndrome data to correct the read data. The external device should have a syndrome register and an error correcting circuit.

Following from the above description and disclosure summaries, it should be apparent to those of ordinary skill in the art that, while the methods and apparatuses herein described constitute exemplary embodiments of the present disclosure, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the disclosure in order to fall within the scope of any claims, since the invention is defined by the claims and since inherent and/or unforeseen advantages of the present invention may exist even though they may not have been explicitly discussed herein.

What is claimed is:

1. A memory device including at least one memory chip having a memory array for storing data and error correcting information, wherein the memory chip includes:
    an error detecting circuit for performing a calculation on the stored data and the stored error correcting information to obtain error detection information indicating locations of bit errors in the stored data; and a first output circuit that outputs, from the memory chip, uncorrected data read from the memory array and corresponding error detection information calculated by the error detecting circuit, indicating the locations of bit errors in the uncorrected data.

2. The memory device of claim 1, wherein the data and the error correcting information stored in the memory array are organized into code blocks, a read latency time is specified for the data in each code block, and the first output circuit outputs both the uncorrected data and the error detection information of each code block within the specified read latency time.

3. The memory device of claim 1, wherein if the data stored in the memory array are all '1' bits, the error correcting information stored in the memory array is also all '1' bits.

4. The memory device of claim 1, wherein the error detecting circuit performs a syndrome calculation to generate the error detection information.

5. The memory device of claim 1, wherein the first output circuit is a multiplexer that multiplexes the error detection information with the uncorrected data.

6. The memory device of claim 1, wherein the uncorrected data and the error detection information are output from the memory device.

7. The memory device of claim 6, further including a package with package pins from which the uncorrected data and the error detection information are output.

8. The memory device of claim 7, further including a substrate on which the at least one memory chip is mounted, the substrate having a data bus to which the first output circuit of the at least one memory chip and the package pins of the package are electrically connected.

9. The memory device of claim 8, wherein the package is a multiple chip package.

10. The memory device of claim 1, further including a memory controller chip that receives the uncorrected data and the error detection information from the at least one memory chip, the memory controller chip having:
    an error correcting circuit for correcting the errors in the uncorrected data by using the error detection information to generate corrected data; and
    a second output circuit for output of the corrected data from the memory device.

11. The memory device of claim 10, wherein the error correcting circuit includes:
    an error correcting table memory storing error location patterns corresponding to the error detection information;
    an error locating circuit for reading an error location pattern stored in the error correcting table memory, corresponding to the error detection information received from the first output circuit; and
    a logic circuit for performing a bit-wise exclusive logical operation on the error location pattern read by the error locating circuit and the uncorrected data received from the first output circuit.

12. The memory device of claim 10, farther including a substrate on which the memory controller chip and the at least one memory chip are mounted, the substrate having a data bus to which the first output circuit of the at least one memory chip and the error correcting circuit of the memory controller chip are electrically connected.

13. The memory device of claim 12, further including a package with package pins from which the corrected data are output, the package pins being electrically connected to the second output circuit.

14. The memory device of claim 13, wherein the package is a multiple chip package.

* * * * *